(12) United States Patent
Leum

(10) Patent No.: US 10,518,990 B2
(45) Date of Patent: *Dec. 31, 2019

(54) OUTDOOR MOBILE LOADING DOCK

(71) Applicant: Grant Leum, Excelsior, MN (US)

(72) Inventor: Grant Leum, Excelsior, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,683

(22) Filed: Apr. 17, 2019

(65) Prior Publication Data

US 2019/0344984 A1 Nov. 14, 2019

Related U.S. Application Data

(63) Continuation of application No. 15/977,350, filed on May 11, 2018.

(51) Int. Cl.
*B65G 69/00* (2006.01)
*B65G 69/30* (2006.01)

(52) U.S. Cl.
CPC .................. *B65G 69/30* (2013.01)

(58) Field of Classification Search
CPC ........................................... B65G 69/30
USPC .................................. 14/69.5–72.5
See application file for complete search history.

(56) References Cited

U.S. PATENT DOCUMENTS

| | | | | |
|---|---|---|---|---|
| 2,607,937 A | * | 8/1952 | Stone | B65G 69/30 14/69.5 |
| 4,624,446 A | * | 11/1986 | Gould | B65G 69/006 254/88 |
| 4,765,792 A | * | 8/1988 | Cherry | B65G 69/003 14/71.1 |
| 6,368,043 B1 | * | 4/2002 | Leum | B65G 69/005 14/71.7 |
| 6,676,359 B2 | * | 1/2004 | Ganiere | B64F 1/3055 414/391 |
| 6,898,815 B2 | * | 5/2005 | Young | B65G 69/30 14/69.5 |
| 7,670,096 B2 | * | 3/2010 | Leum | B65G 69/006 14/71.1 |
| 8,869,334 B1 | * | 10/2014 | Leum | B65G 69/30 14/69.5 |
| 9,688,493 B2 | * | 6/2017 | Leum | B65G 69/287 |
| 9,776,547 B2 | * | 10/2017 | Lin | B60P 1/436 |
| 2004/0221404 A1 | * | 11/2004 | Bender | B65G 69/2817 14/69.5 |
| 2014/0271100 A1 | * | 9/2014 | Giemza | B65G 69/30 414/813 |

* cited by examiner

*Primary Examiner* — Raymond W Addie

(74) *Attorney, Agent, or Firm* — Jansson Munger McKinley & Kirby Ltd.

(57) ABSTRACT

An outdoor mobile loading dock having a frame and a planar ramp member. The frame including two opposing side rails and support beams, the support beams having a first end and a second end, the first end secured to one of the opposing side rails and the second end secured to the second opposing side rail. The planar ramp member having a lower end and an upper end, the upper end including an upper edge having a lip and an upper ramp portion adjacent the upper edge. The upper ramp member being substantially parallel to the ground.

12 Claims, 3 Drawing Sheets

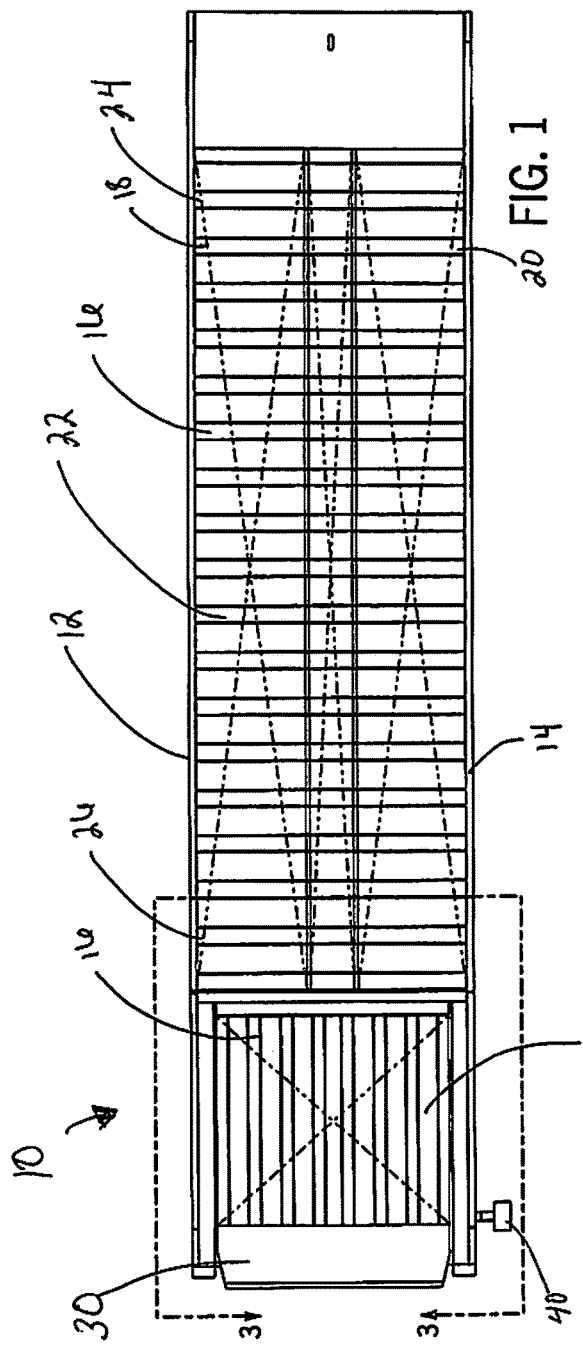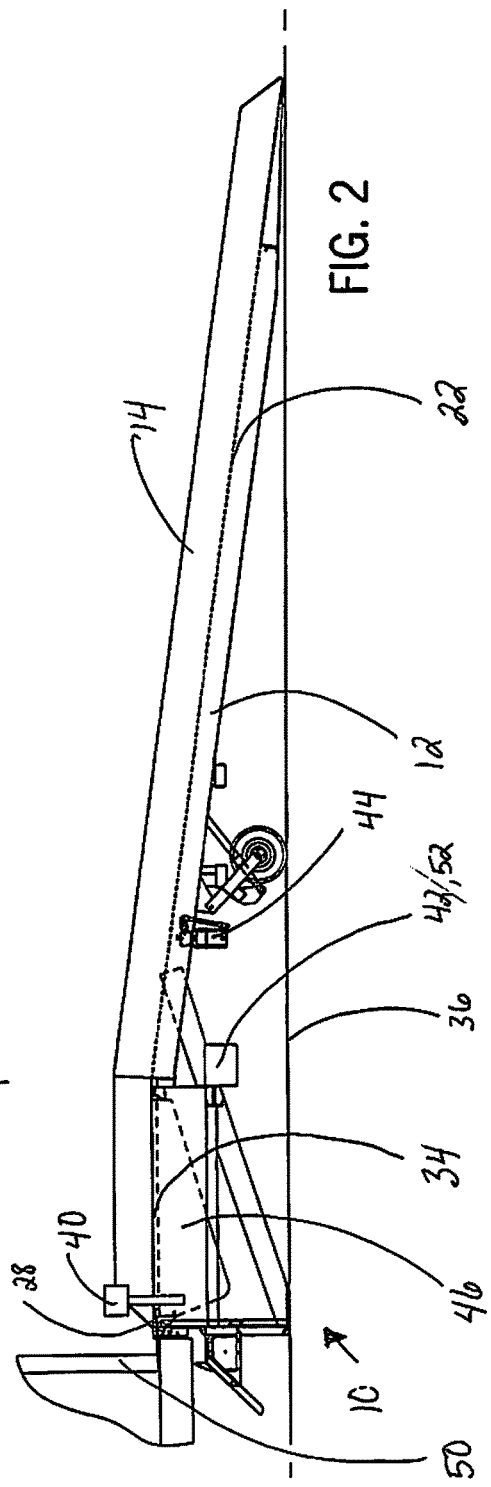

OUTDOOR MOBILE LOADING DOCK

RELATED APPLICATION

This application is a continuation application claiming the benefit of application Ser. No. 15/977,350, filed on May 11, 2018, the entire contents of which are incorporated herein.

FIELD OF THE INVENTION

This invention relates to mobile loading docks and more particularly to an outdoor mobile loading dock with improved vehicle traction.

BACKGROUND OF THE INVENTION

A variety of loading docks have been devised to adjust the height of different trailers to properly match the deck of the trailer to the height of the dock. By aligning the height of the trailer and the dock the loading and unloading of cargo is facilitated.

There are numerous such devices in the prior art. One such device is seen in U.S. Pat. No. 4,624,446 to Gould which discloses a reinforced platform pivotally mounted to the ground at one end and includes a solid surface ramp portion.

Loading docks of the prior art typically have certain disadvantages. The majority of moveable loading docks have solid ramp surface onto which vehicles drive when loading and unloading cargo. These solid ramp surfaces can become slippery with rain or ice as well as covered in snow. This can cause difficulties with traction and mobility for both the vehicles and individuals involved as well as safety concerns. Removing snow or ice from solid surface ramp surfaces can be difficult and time consuming.

Some mobile loading docks of the prior art have certain shortcomings and disadvantages to which this device is drawn. Specifically, it would be advantageous to have an edge of dock leveler which has an improved open-grate platform for increased traction, mobility and safety.

In summary, there are problems and shortcomings in the prior art dock levelers and it is to these needs that this device is drawn.

OBJECTS OF THE INVENTION

It is an object of this invention to provide a mobile loading dock with an open-grate surface for improved vehicle mobility and traction.

Another object of this invention is to provide such a mobile loading dock with a planar ramp member that has an open-grate surface along its length for improved vehicle mobility and traction.

These and other objects of the invention will be apparent from the following descriptions and from the drawings.

SUMMARY OF THE INVENTION

In a first embodiment of the present invention an outdoor mobile loading dock having a frame and a planar ramp member. The frame having two opposing side rails and support beams, the support beams having a first end and a second end, the first end secured to one of the opposing side rails and the second end secured to the second opposing side rail. The planar ramp member having a lower end and an upper end, the upper end including an upper edge having a lip, the lip being able to be activated between an extended/ engaged position to contact a truck bed and a retracted/ disengaged position; and an upper ramp portion adjacent the upper edge and being substantially parallel to the ground, the upper ramp member being able to be moved between an upward and downward position, whereby vehicle mobility and traction on the planar ramp member are improved.

In some embodiments the mobile loading dock includes a solar panel mounted to the frame, the solar panel connected to a battery and a hydraulic pump to provide power for movement of the loading dock. Preferably, the battery is a rechargeable battery.

It is preferable in some embodiments that a solar-powered hydraulic system provides power which enables movement of the loading dock. A highly-preferred embodiment includes the planar ramp member being substantially comprised of an open-grate surface, and preferably, the upper ramp portion includes an integrated dock leveler.

In preferred embodiments, the lip includes a moveable safety-barrier portion. The planar ramp member and lip in some embodiments are powered by the solar-panel, hydraulic pump and battery.

Preferably, support beams are affixed to the underside of the upper ramp member and are configured to transfer and carry the forklift tire load.

Other preferred embodiments include an outdoor portable loading dock having a portable frame configured to allow the dock to be moved to different locations. The portable frame includes two opposing side rails, and support beams, the support beams having a first end and a second end, the first end secured to one of the opposing side rails and the second end secured to the second opposing side rail; and a planar ramp member separate from and not integrally formed with the portable frame, the planar ramp member having a lower end and an upper end, the upper end including an upper edge having a lip, the lip being able to be activated between an extended/engaged position to contact a truck bed and a retracted/disengaged position; and an upper ramp portion adjacent the upper edge and being substantially parallel to the ground, the upper ramp member being able to be moved between an upward and downward position, wherein vehicle mobility and traction on the planar ramp member are improved.

Preferred embodiments include the planar ramp member either being welded or not welded to the portable frame.

In other preferred embodiments, an outdoor portable loading dock includes a planar ramp member having a lower end and an upper end, the upper end including an upper edge having a lip, the lip being able to be activated between an extended/engaged position to contact a truck bed and a retracted/disengaged position and an upper ramp portion adjacent the upper edge and being substantially parallel to the ground, the upper ramp member being able to be moved between an upward and downward position, such that vehicle mobility and traction on the planar ramp member are improved.

In such preferred embodiments, the planar ramp member is substantially comprised of an open-grate surface.

It is highly preferred that the upper ramp portion include an integral hinged dock leveler with a hinged safety barrier/ lip. Preferably, the leveler bridges the gap from the ramp structure to the bed of the trailer. As trailers have a variety of trailer bed heights, the leading edge of the front-hinged lip that traverses into the trailer can safely be placed on any trailer bed which is between 34"-58" off of grade. This correlates to 98% or more of the trailers currently on the road.

It is also preferable to include an integral hinged dock leveler due to the float required as the forklift enters the trailer. As a forklift enters a trailer, the added weight of the forklift causes the suspension and tires on the trailer to move up and down as the weight fluctuates while loading or unloading of cargo occurs. Preferably, the dock leveler must be able to float to maintain a safe bridge between the trailer and ramp/dock.

It is highly preferred that the mobile loading dock include a hydraulic leveler. This eliminates a major problem with mechanical dock levelers, called "stump out," which is caused by the safety support legs that are on all mechanical dock plates. "Stump out" occurs on trailer beds below dock level. The mechanical leveler can have its legs retracted at the start of the operation, but due to the vertical float of the trailer bed, these legs can snap back into a vertical position restricting the vertical travel of the dock plate.

Preferably, the hydraulic system utilizes the vertically mounted lift cylinder and a hydraulic flow control valve to provide the safety needed in case of a trailer prematurely departing, causing the leveler lip to be unsupported. In the event of excessive flow, a velocity fuse will preferably hydraulically lock, keeping the leveler and forklift driver safely supported. An embodiment of the mobile loading dock of this application can include solar power, but does not have to. This provides the added safety and ease of use of a hydraulic dock leveler without the typical additional wiring. Very often it is quite difficult, expensive and often impossible to get electrical service to the location of the portable or mobile docks as they are remote from buildings.

In some embodiments the upper ramp portion be made with open bar grating materials instead of the standard steel tread plate. Other embodiments include the upper ramp member being made with a standard, solid steel tread plate.

Preferably, the structure of the open grate dock leveler uses the top bar grate to only transfer the forklift tire loads from beam to beam, therefore requiring the beam structure underneath to carry the entire load without composite benefit from the traffic surface (planar ramp member). Therefore, the support beams are much larger and stronger in the loading dock than in a traditional dock plate.

Preferably, the mobile loading dock is used outdoors as the ramp surface is made of open grating to allow snow and ice to fall through which allows for better traction with the elimination of snow buildup on the ramp surface. With a traditional dock plate outside, the solid plate holds the snow and ice which can cause dangerous conditions. This is especially true considering a mechanical dock plate requires a user to walk up the inclined surface and to walk down the plate onto the trailer.

BRIEF DESCRIPTION OF THE DRAWINGS

FIG. 1 is a top view of the mobile loading dock;

FIG. 2 is a side view of the mobile loading dock in FIG. 1;

DETAILED DESCRIPTION OF PREFERRED EMBODIMENTS

Figure 3:
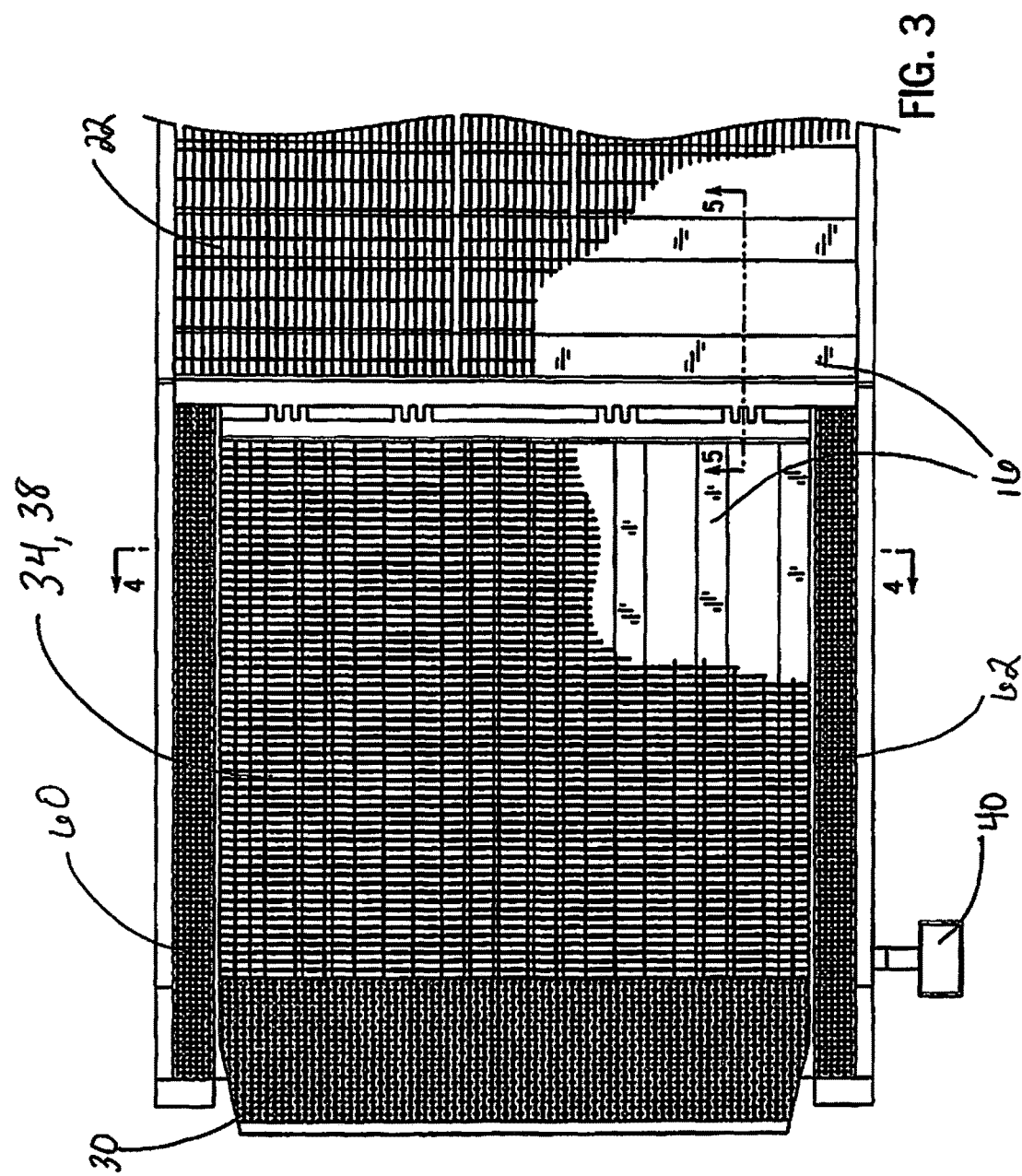
FIG. 3 is a perspective view of the upper end of the mobile loading dock in FIG. 1.

A preferred embodiment of the present invention is shown in FIGS. 1-5. The outdoor mobile loading dock 10, as shown in FIGS. 1-5, includes a frame 12 which has two opposing side rails 14 and support beams 16, support beams 16 having a first end 18 and a second end 20. First end 18 is secured to one of opposing side rails 14 and second end 20 is secured to second opposing side rail 14. A planar ramp member 22 has a lower end 24 and an upper end 26. Upper end 26 includes an upper edge 28 which has a lip 30. Lip 30 is able to be activated between an extended/engaged position to contact a truck bed (not shown) and a retracted/disengaged position. Planar ramp member 22 has an upper ramp portion 34 adjacent upper edge 28 and is substantially parallel to the ground 36. In some embodiments upper ramp portion 34 has an open-grate section 38 to facilitate drainage of water through open-grate section 38 to the ground 36 below, but in other embodiments upper ramp portion 34 is a solid plate and does not have an open-grate section. Planar ramp member 22 is able to be moved between upward and downward positions; as a result vehicle mobility and traction on planar ramp member 22 is improved. Typical loading docks of the prior art use solid diamond plate as the ramp surface. The inventive loading dock 10 is used outdoors so traction and snow/ice removal are critical.

FIGS. 1-2 illustrate that in some embodiments, a solar panel 40 can be mounted to frame 12. Solar panel 40 is connected to a battery 42 and a hydraulic pump 44 to provide power for movement of loading dock 10 as well as for operation of integrated dock leveler 46 and are contained in a containment box 52 located on the underside of ramp 10. It is within the scope of the invention to use a solar-powered hydraulic system to provide power enabling movement of loading dock 10. Loading dock 10 can be manufactured either with or without solar panel 40. If loading dock 10 does not include solar panel 40 other conventional power sources can be used. Using a solar panel 40 with a battery 42 eliminates the need to run cords or power outside to the location of loading dock 10 since the inventive loading dock 10 is an outdoor mobile loading dock. Some embodiments of the invention also include a built-in battery charger (not shown).

FIG. 3 illustrates that planar ramp member 22 can be comprised of many types of solid (such as diamond plate) or open-grate materials. In FIG. 3, for example, planar ramp member 22 is substantially comprised of open-grate surface 38. FIG. 3 also illustrates that upper ramp portion 34 includes two opposing lateral extension portions 60, 62 as well as that upper ramp portion 34 includes an integrated dock leveler 46.

FIGS. 1 and 3 illustrate that support beams 16 are affixed to an underside of planar ramp member 22 and are configured to transfer and carry the forklift tire load. Support beams 16 can be I-beams as well as tube, channel-shaped or other shapes to satisfy specific structural needs. These will be apparent to those skilled in the art.

Figure 4:
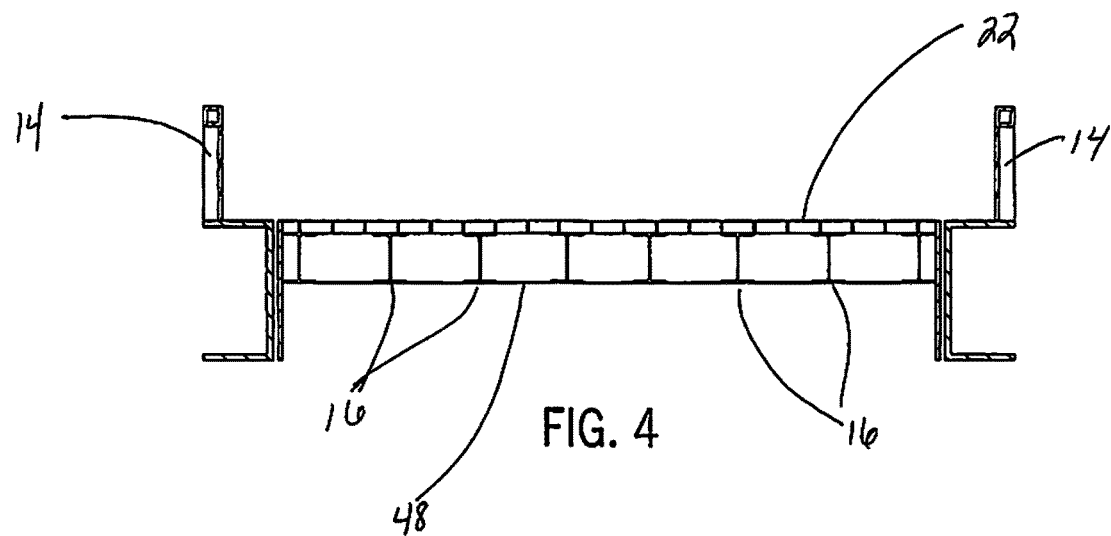
FIG. 4 is a view of the mobile loading dock embodiment of FIG. 3 taken in the direction of line 4-4.
Figure 5:
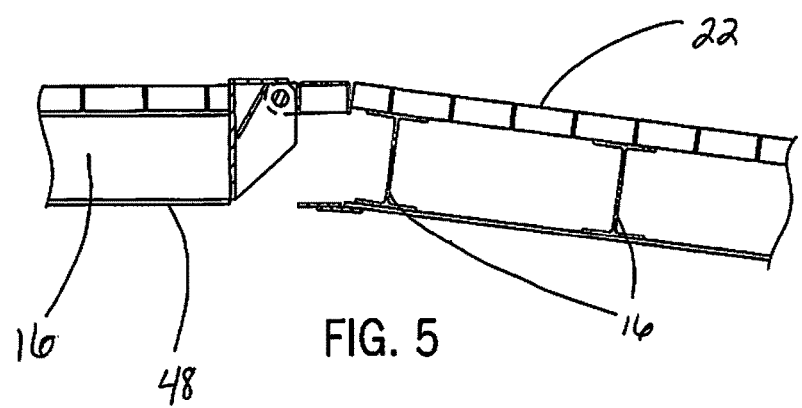
FIG. 5 is a further view of the mobile loading dock embodiment of FIG. 3 taken in the direction of line 5-5.

FIGS. 4 and 5 illustrate in more detail that appropriately sized I-beams can be used and affixed to the underside of planar ramp member 22. As can be seen best in FIGS. 3 and 5, in some embodiments the direction of support beams 16 changes at the intersection of lower end 24 of planar ramp member 22 and upper ramp portion 34. Support beams 16 are affixed to the underside of upper ramp member 48 as well as affixed to the underside of the complete length of planar ramp member 22 except at a lower edge of lower end 24. FIG. 3 has a cutaway portion which illustrates support beams 16 underneath open-grate section 38.

Upper end 26 of loading dock 10 includes a lip 30 at upper edge 28 as seen in FIG. 3. Lip 30 in some embodiments can be powered by solar panel 40, hydraulic pump and battery.

Lip 30 can also be powered by more conventional methods as known by those skilled in the art in other embodiments. Lip 30 in some embodiments can include a moveable safety-barrier portion 50 and is at least five inches high. Lip 30 in other embodiments does not function as a safety barrier. When in use, lip 30 rotates onto the bed of a truck/trailer for easy loading and unloading. When not in use, lip 30 can also rotate in some embodiments to act as an upright safety barrier to prevent fork trucks from driving off the end of mobile loading dock 10 inadvertently.

An alternative highly-related embodiment includes outdoor portable loading dock 10 having portable frame 12 configured to allow dock 10 to be moved to different locations. Portable frame 12 includes two opposing side rails 14 and support beams 16. Dock 10 includes planar ramp member 22 which is separate from and not integrally formed with portable frame 12. Planar ramp member 22 has lower end 24 and upper end 26 with upper end 26 including upper edge 28 with lip 30. Lip 30 is able to be activated between an extended/engaged position to contact a truck bed and a retracted/disengaged position (not shown). In this embodiment, upper ramp portion 34 is also adjacent upper edge 28 and substantially parallel to ground 36. In this embodiment, planar ramp member 22 is not welded to frame 12.

A wide variety of materials are available for the various parts discussed and illustrated herein. Although the device has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. An outdoor mobile loading dock comprising:
   a frame including (a) two opposing side rails, and (b) support beams, the support beams having a first end and a second end, the first end secured to one of the opposing side rails and the second end secured to the second opposing side rail;
   a planar ramp member having a lower end and an upper end, the upper end including an upper edge having a lip, the lip being able to be activated between an extended/engaged position to contact a truck bed and a retracted/disengaged position; and an upper ramp portion adjacent the upper edge and being substantially parallel to the ground, the planar ramp member being able to be moved between an upward and downward position, the support beams being affixed to an underside of the planar ramp member and being configured to transfer and carry a forklift tire load.

2. The mobile loading dock of claim 1 further including a solar panel mounted to the frame, the solar panel connected to a battery and a hydraulic pump to provide power for movement of the loading dock.

3. The mobile loading dock of claim 1 wherein the upper ramp portion includes an integrated dock leveler.

4. The mobile loading dock of claim 1 wherein the lip includes a moveable safety-barrier portion.

5. The mobile loading dock of claim 1 further including a solar panel mounted to the frame, the solar panel connected to a battery and a hydraulic pump to provide power for a leveling action of the loading dock.

6. The mobile loading dock of claim 5 wherein the battery is a rechargeable battery.

7. An outdoor portable loading dock comprising:
   a portable frame configured to allow the dock to be moved to different locations, the portable frame including (a) two opposing side rails, and (b) support beams, the support beams having a first end and a second end, the first end secured to one of the opposing side rails and the second end secured to the second opposing side rail; and
   a planar ramp member separate from and not integrally formed with the portable frame, the planar ramp member having a lower end and an upper end, the upper end including an upper edge having a lip, the lip being able to be activated between an extended/engaged position to contact a truck bed and a retracted/disengaged position; and an upper ramp portion adjacent the upper edge and being substantially parallel to the ground, the upper ramp member being able to be moved between an upward and downward position,
   wherein the support beams are affixed to an underside of the planar ramp member and are configured to transfer and carry a forklift tire load.

8. The outdoor portable loading dock of claim 7 wherein the planar ramp member is not welded to the portable frame.

9. The mobile loading dock of claim 7 further including a solar panel mounted to the frame, the solar panel connected to a battery and a hydraulic pump to provide power for movement of the loading dock.

10. The mobile loading dock of claim 7 wherein the upper ramp portion includes an integrated dock leveler.

11. An outdoor portable loading dock comprising a planar ramp member having a lower end and an upper end, the upper end including an upper edge having a lip, the lip being able to be activated between an extended/engaged position to contact a truck bed and a retracted/disengaged position; and an upper ramp portion adjacent the upper edge and being substantially parallel to the ground, the planar ramp member being able to be moved between an upward and downward position, the planar ramp member including support beams affixed to an underside of the planar ramp member and being configured to transfer and carry a forklift tire load.

12. The mobile loading dock of claim 11 wherein the lip includes a moveable safety-barrier portion.

* * * * *